US012068799B2

(12) United States Patent
Wang et al.

(10) Patent No.: US 12,068,799 B2
(45) Date of Patent: Aug. 20, 2024

(54) METHOD AND APPARATUS FOR BANDWIDTH-ADAPTIVE AND MODEL-ORDER-ADAPTIVE CHANNEL PREDICTION

(71) Applicant: Samsung Electronics Co., Ltd., Suwon-si (KR)

(72) Inventors: Rui Wang, San Jose, CA (US); Yang Li, Plano, TX (US); Yeqing Hu, Allen, TX (US); Junmo Sung, Richardson, TX (US); Tiexing Wang, Plano, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 421 days.

(21) Appl. No.: 17/541,160

(22) Filed: Dec. 2, 2021

(65) Prior Publication Data

US 2022/0278762 A1 Sep. 1, 2022

Related U.S. Application Data

(60) Provisional application No. 63/155,165, filed on Mar. 1, 2021.

(51) Int. Cl.
*H04B 17/373* (2015.01)
*H04B 1/713* (2011.01)
(Continued)

(52) U.S. Cl.
CPC ......... *H04B 17/373* (2015.01); *H04B 7/0626* (2013.01); *H04B 7/0639* (2013.01); *H04B 1/713* (2013.01); *H04L 5/0048* (2013.01)

(58) Field of Classification Search
CPC .. H04B 17/373; H04B 7/0626; H04B 7/0639; H04B 1/713; H04L 5/0048
See application file for complete search history.

(56) References Cited

U.S. PATENT DOCUMENTS 7,006,848 B2    2/2006  Ling et al.
9,130,630 B2    9/2015  Xu et al.
(Continued)

FOREIGN PATENT DOCUMENTS

CN    111865450 A      10/2020
WO    2020065403 A1     4/2020
WO    2020221126 A1    11/2020

OTHER PUBLICATIONS

"5G; NR; Physical channels and modulation (3GPP TS 38.211 version 16.2.0 Release 16)", ETSI TS 138 211 V16.2.0, Jul. 2020, 136 pages.

(Continued)

*Primary Examiner* — Yemane Mesfin
*Assistant Examiner* — Salma Ayad (57) ABSTRACT

Methods and apparatuses for a channel estimation and prediction operation in a wireless communication systems. A method of a BS comprises: receiving an SRS; partitioning, based on a partition policy, a frequency band of the SRS into sub-bandwidths in a frequency domain; generating, based on previously stored CSI in memory and the partition policy, a set of chunks corresponding to respective sub-bandwidths; performing CHPD operations corresponding to the respective sub-bandwidths to generate channel parameters, wherein different CHPD operations are applied to the respective sub-bandwidths; combining the channel parameters predicted from the respective sub-bandwidths in the frequency domain; and performing, based on the combined channel parameters, a channel estimation and prediction operation.

20 Claims, 8 Drawing Sheets

(51) Int. Cl.
*H04B 7/06* (2006.01)
*H04L 5/00* (2006.01)

(56) References Cited

U.S. PATENT DOCUMENTS

| | | | |
|---|---|---|---|
| 10,659,118 | B2 | 5/2020 | Rahman et al. |
| 10,868,605 | B2 | 12/2020 | Wang et al. |
| 2018/0302863 | A1* | 10/2018 | Petersson ............... H04W 72/54 |
| 2019/0386764 | A1 | 12/2019 | Choi et al. |
| 2020/0099434 | A1 | 3/2020 | Wang et al. |
| 2021/0014030 | A1 | 1/2021 | Matsumoto et al. |
| 2021/0091838 | A1* | 3/2021 | Bai ...................... H04B 7/0639 |
| 2021/0273710 | A1* | 9/2021 | Song ................... H04W 72/542 |
| 2022/0052881 | A1 | 2/2022 | Guo et al. |
| 2023/0361842 | A1* | 11/2023 | Hajri ................... H04B 7/0639 |

OTHER PUBLICATIONS

"5G; NR; Multiplexing and channel coding (3GPP TS 38.212 version 16.2.0 Release 16)", ETSI TS 138 212 V16.2.0, Jul. 2020, 154 pages.
"5G; NR; Physical layer procedures for control (3GPP TS 38.213 version 16.2.0 Release 16)", ETSI TS 138 213 V16.2.0, Jul. 2020, 180 pages.
"5G; NR; Physical layer procedures for data (3GPP TS 38.214 version 16.2.0 Release 16)", ETSI TS 138 214 V16.2.0, Jul. 2020, 167 pages.
International Search Report and Written Opinion issued Apr. 18, 2022 regarding International Application No. PCT/KR2022/000633, 7 pages.
Extended European Search Report issued Feb. 6, 2024 regarding Application No. 22763459.9, 9 pages.

* cited by examiner

METHOD AND APPARATUS FOR BANDWIDTH-ADAPTIVE AND MODEL-ORDER-ADAPTIVE CHANNEL PREDICTION

CROSS-REFERENCE TO RELATED APPLICATIONS AND CLAIM OF PRIORITY

The present application claims priority to U.S. Provisional Patent Application No. 63/155,165, filed on Mar. 1, 2021. The content of the above-identified patent document is incorporated herein by reference.

TECHNICAL FIELD

The present disclosure relates generally to wireless communication systems and, more specifically, the present disclosure relates to bandwidth-adaptive and model-order-adaptive channel prediction in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to bandwidth-adaptive and model-order-adaptive channel prediction in a wireless communication system.

In one embodiment, a base station (BS) in a wireless communication is provided. The BS comprises a transceiver configured to receive a sounding reference signal (SRS). The BS further comprises a processor operably connected to the transceiver, the processor configured to: partition, based on a partition policy, a frequency band of the SRS into sub-bandwidths in a frequency domain; generate, based on previously stored channel state information (CSI) in memory and the partition policy, a set of chunks corresponding to respective sub-bandwidths; perform channel prediction (CHPD) operations corresponding to the respective sub-bandwidths to generate channel parameters, wherein different CHPD operations are applied to the respective sub-bandwidths; combine the channel parameters predicted from the respective sub-bandwidths in the frequency domain; and perform, based on the combined channel parameters, a channel estimation and prediction operation.

In another embodiment, a method of a BS in a wireless communication is provided. The method comprises: receiving an SRS; partitioning, based on a partition policy, a frequency band of the SRS into sub-bandwidths in a frequency domain; generating, based on previously stored CSI in memory and the partition policy, a set of chunks corresponding to respective sub-bandwidths; performing CHPD operations corresponding to the respective sub-bandwidths to generate channel parameters, wherein different CHPD operations are applied to the respective sub-bandwidths; combining the channel parameters predicted from the respective sub-bandwidths in the frequency domain; and performing, based on the combined channel parameters, a channel estimation and prediction operation.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Those skilled in the art will understand that the various illustrative logical blocks, modules, circuits, and steps described in this application can be implemented as hardware, software, or a combination of both. In order to clearly illustrate the interchangeability of hardware and software, various illustrative components, blocks, modules, circuits, and steps are generally described above in the form of their function sets. Whether such a feature set is implemented as hardware or software depends on the specific application and design constraints imposed on the overall system. Technicians can implement the described function set in different ways for each specific application, but such design decisions should not be construed as causing a departure from the scope of this application.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1-9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.2.0, "NR; Physical channels and modulation"; 3GPP TS 38.212 v16.2.0, "NR; Multiplexing and Channel coding"; 3GPP TS 38.213 v16.2.0, "NR; Physical Layer Procedures for Control"; and 3GPP TS 38.214 v16.2.0, "NR; Physical Layer Procedures for Data".

Figure 1:
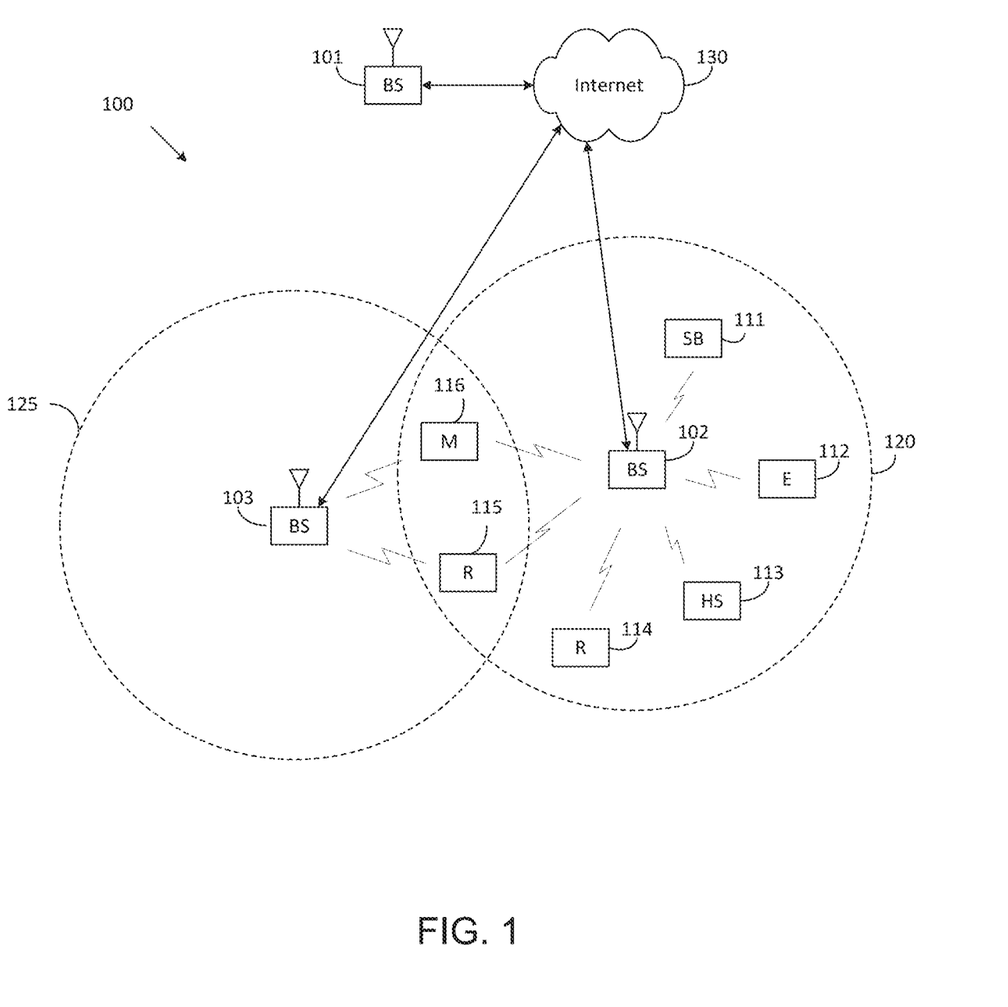
FIG. 1 illustrates an example wireless network according to embodiments of the present disclosure.
Figure 2:
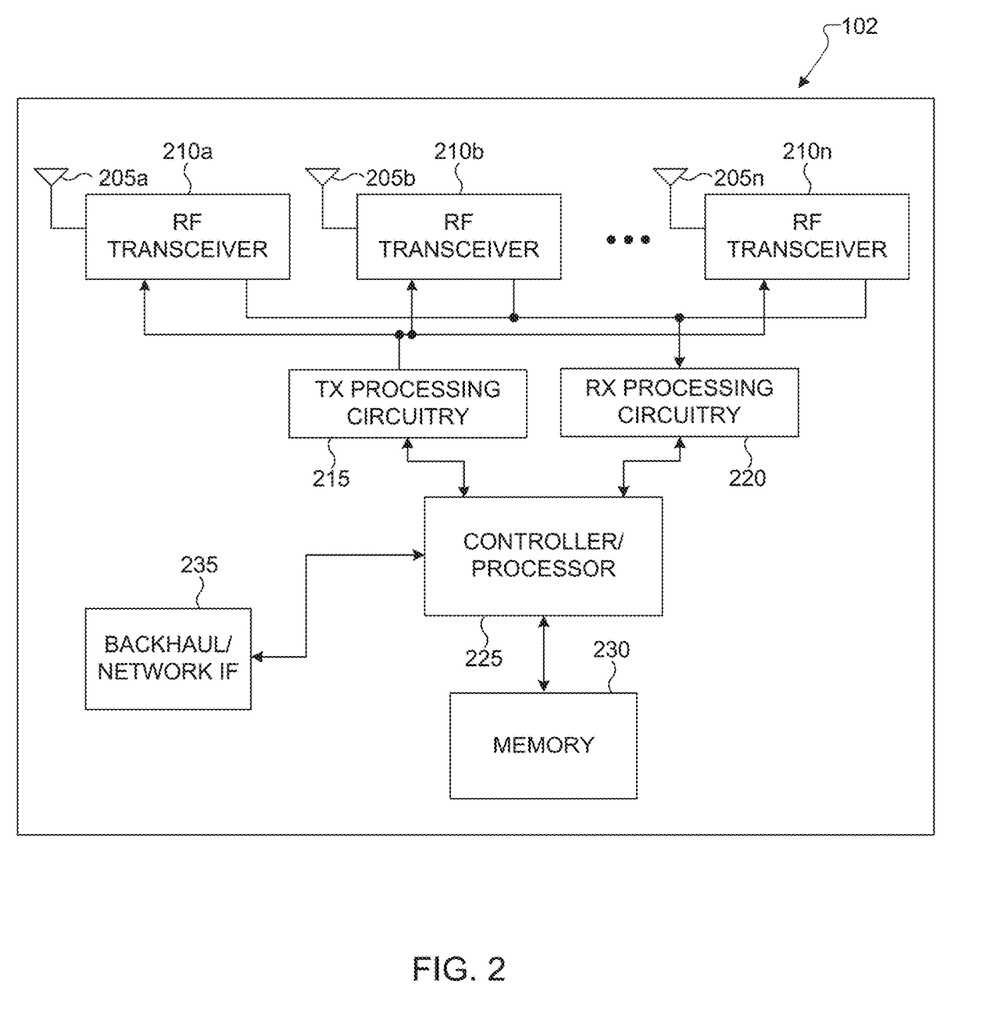
FIG. 2 illustrates an example gNB according to embodiments of the present disclosure.
Figure 3:
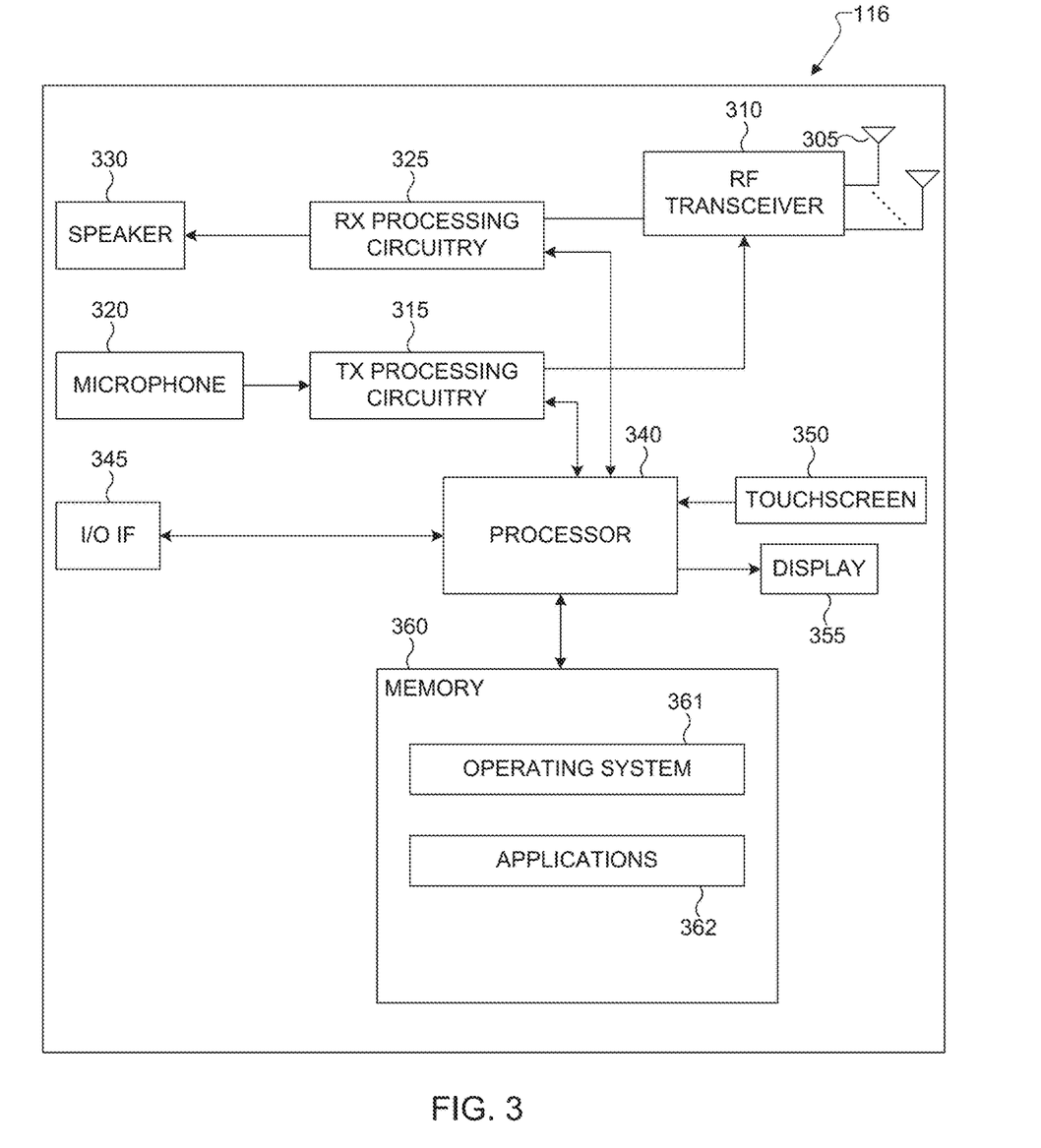
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for bandwidth-adaptive and model order adaptive channel prediction in a wireless communication system. In certain embodiments, and one or more of the gNBs 101-103 includes circuitry, programing, or a combination thereof, for bandwidth-adaptive and model order adaptive channel prediction in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of UL channel signals and the transmission of DL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for bandwidth-adaptive and model order adaptive channel prediction in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4:
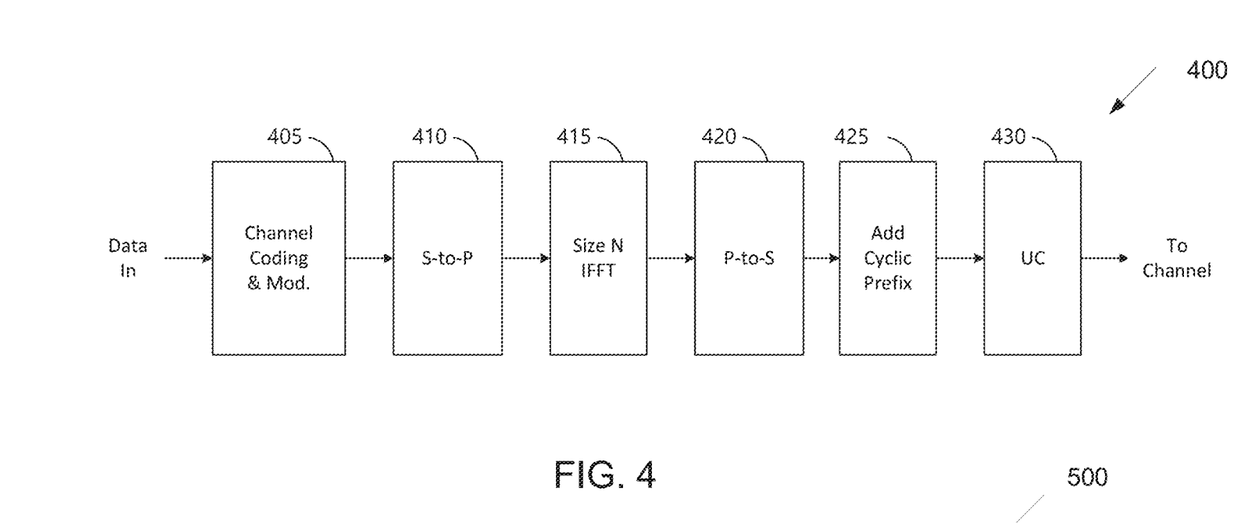
FIGS. 4 and 5 illustrate example wireless transmit and receive paths according to this disclosure.
Figure 5:
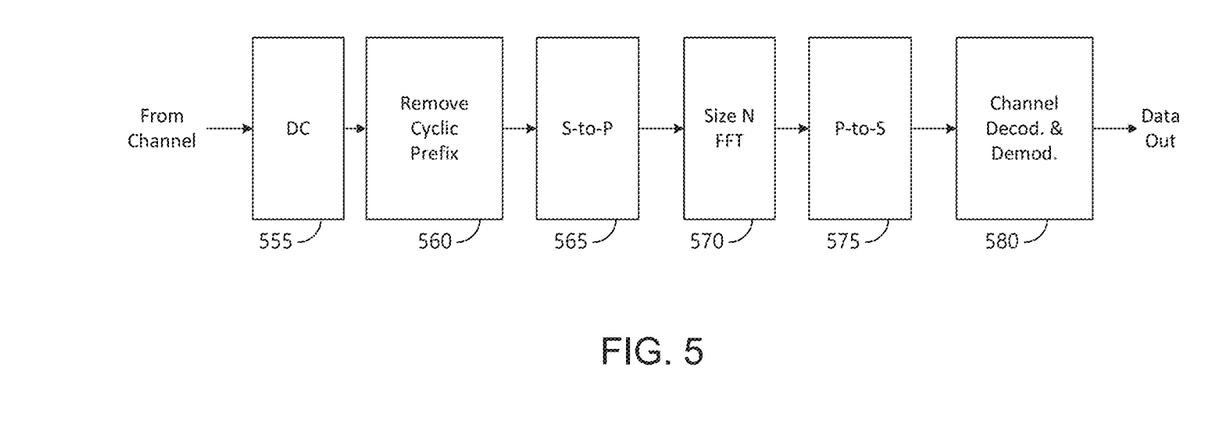

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having two dimensional (2D) antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Figure 6:
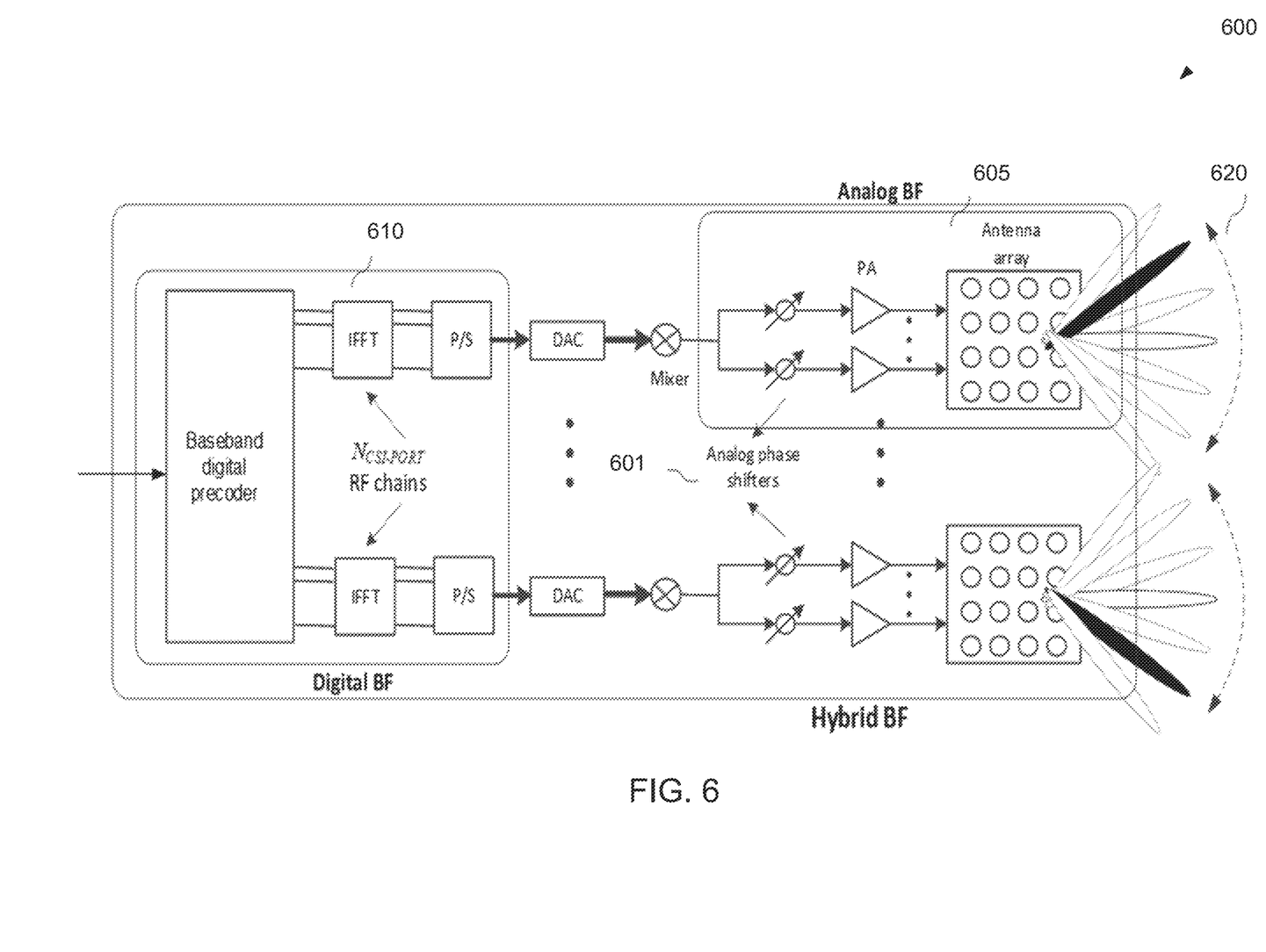
FIG. 6 illustrates an example antenna structure according to embodiments of the present disclosure.

FIG. 6 illustrates an example antenna structure 600 according to embodiments of the present disclosure. An embodiment of the antenna structure 600 shown in FIG. 6 is for illustration only.

In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes. The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Figure 7:
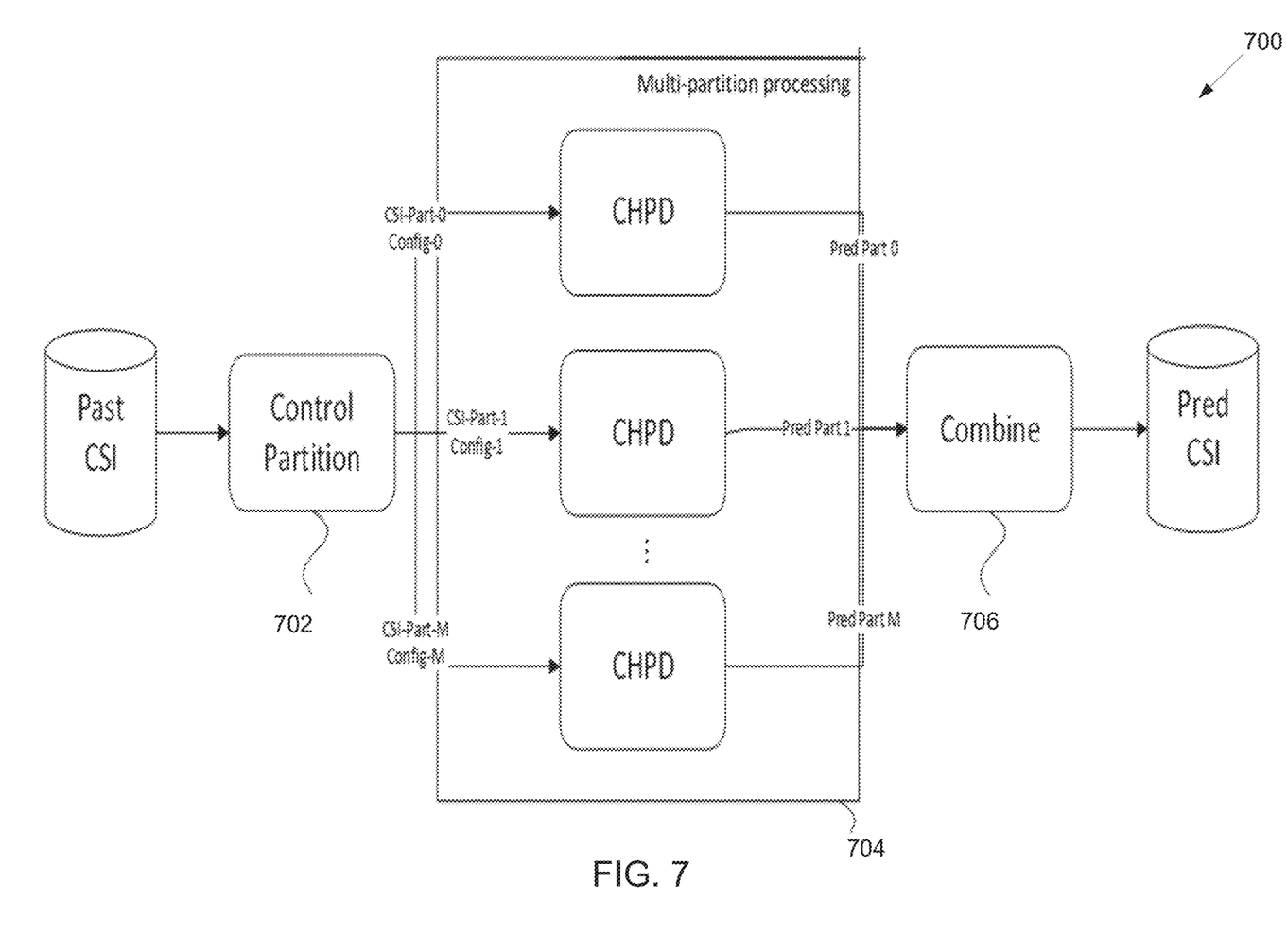
FIG. 7 illustrates an example channel estimation, tracking and prediction for massive MIMO according to embodiments of the present disclosure.

The present disclosure provides a new processing framework of channel estimation, tracking and prediction for massive MIMO (mMIMO) as illustrated in FIG. 7.

FIG. 7 illustrates an example channel estimation, tracking and prediction for massive MIMO 700 according to embodiments of the present disclosure. An embodiment of the channel estimation, tracking and prediction for massive MIMO 700 shown in FIG. 7 is for illustration only.

A mMIMO BS for CSI prediction comprises a transceiver configured to receive sounding reference signal (SRS) and demodulation reference signal (DMRS) from physical Uplink shared channel (PUSCH) from a user equipment (UE), a data buffer structure configured to store past CSI estimates, a control partition unit 702 to separate input data into smaller chunks, a multi-partition processing module 704 to perform channel prediction (CHPD) on these different chunks, and a result combine module 706 to aggregate outcomes from different processors.

As illustrated in FIG. 7, a control partition module 702 receives past CSI estimates from SRS, PUCCH or PUSCH, based on some pre-determined policy or some channel metrics, derives the partition scheme for input past CSI, generates smaller chunks of past CSI and distributes them among multiple CHPD processor.

In one embodiment, a fixed partition policy is used based on SRS configurations such as a transmission type and bandwidth. In another embodiment, an adaptive algorithm is used to determine the optimal partition policy based on certain channel metrics, which include channel delay spread, Doppler spread, SNR, SRS bandwidth, and SRS periodicity etc.

The present disclosure provides various methods on how to adaptively configure tracking models used in channel prediction. The terms "predicted channel"/"channel prediction," and the like, can refer to estimated channel responses for some time instances (which can be referred to as "future time instances"), where the estimation is performed using at least one of the channel responses of the time instances prior to the future time instances.

In the operation of channel estimation, the eNB may estimate one or more parameters based on the received SRS and perform continuous tracking or estimation on these parameters over time instances.

In one embodiment, the received SRS signal is partitioned into several groups in frequency domain, and for each portioned group or frequency band, a same or different channel prediction algorithm is running.

In one embodiment, the SRS frequency domain partitioning or grouping is performed according to a predefined manner, i.e., given certain SRS bandwidth configuration, SRS periodicity and frequency hopping pattern, a pre-determined partition operation will be given. One example is given by TABLES 1A and 1B, where M is number of band partitioned.

TABLE 1A

SB-Partition
SB - Partition each subband into M parts

| BW | Total RB | nRbPerBand | M | nRbPerPartition |
|---|---|---|---|---|
| 20 | 48 | 12 | N/A | N/A |
| 40 | 96 | 24 | N/A | N/A |
| 50 | 128 | 32 | N/A | N/A |
| 80 | 208 | 52 | 1 | 52 |
| 100 | 272 | 68 | 1 | 68 |

TABLE 1B

FB-Partition
FB - Partition the fullband into M parts

| BW | Total RB | nRbPerBand | M | nRbPerPartition |
|---|---|---|---|---|
| 20 | 48 | 48 | 1 | 48 |
| 40 | 96 | 96 | 2 | 48 |
| 50 | 128 | 128 | 2 | 64 |
| 80 | 208 | 208 | 4 | 52 |
| 100 | 272 | 272 | 4 | 68 |

In another embodiment, in the aforementioned group based processing, for each subband partition, it is processed independently as a full-band SRS configuration.

In one embodiment, one or more parameters obtained from one partitioned frequency band or group is used by another bands or groups. For example, the parameter can include path Doppler estimation and/or path delay estimations. In such embodiment, each band may obtain one or more parameters from other bands as priori information but the processing may still be performed independently across bands.

In one embodiment, one or more parameters obtained from partitioned frequency band or group may be further jointly processing, e.g., via linear or non-linear filtering, to produce another estimated parameter. In one example, path delays are obtained from different partitioned bands, and these values are further filtered via averaging window over one or more bands. In another example, the path Doppler frequencies are obtained from different partitioned bands, and the Doppler values are filtered with weighted average window where more weight is given for the Doppler values obtained from most recent group.

In another embodiment, the group or partition methods can be dynamically adjusted depending on the real-time feedback of the performance of channel prediction algorithms. In one example, the performance metric can be ACK/NACK and MCS. In another example, the metric can be the estimation accuracy of the prediction comparing with a true value.

Figure 8:
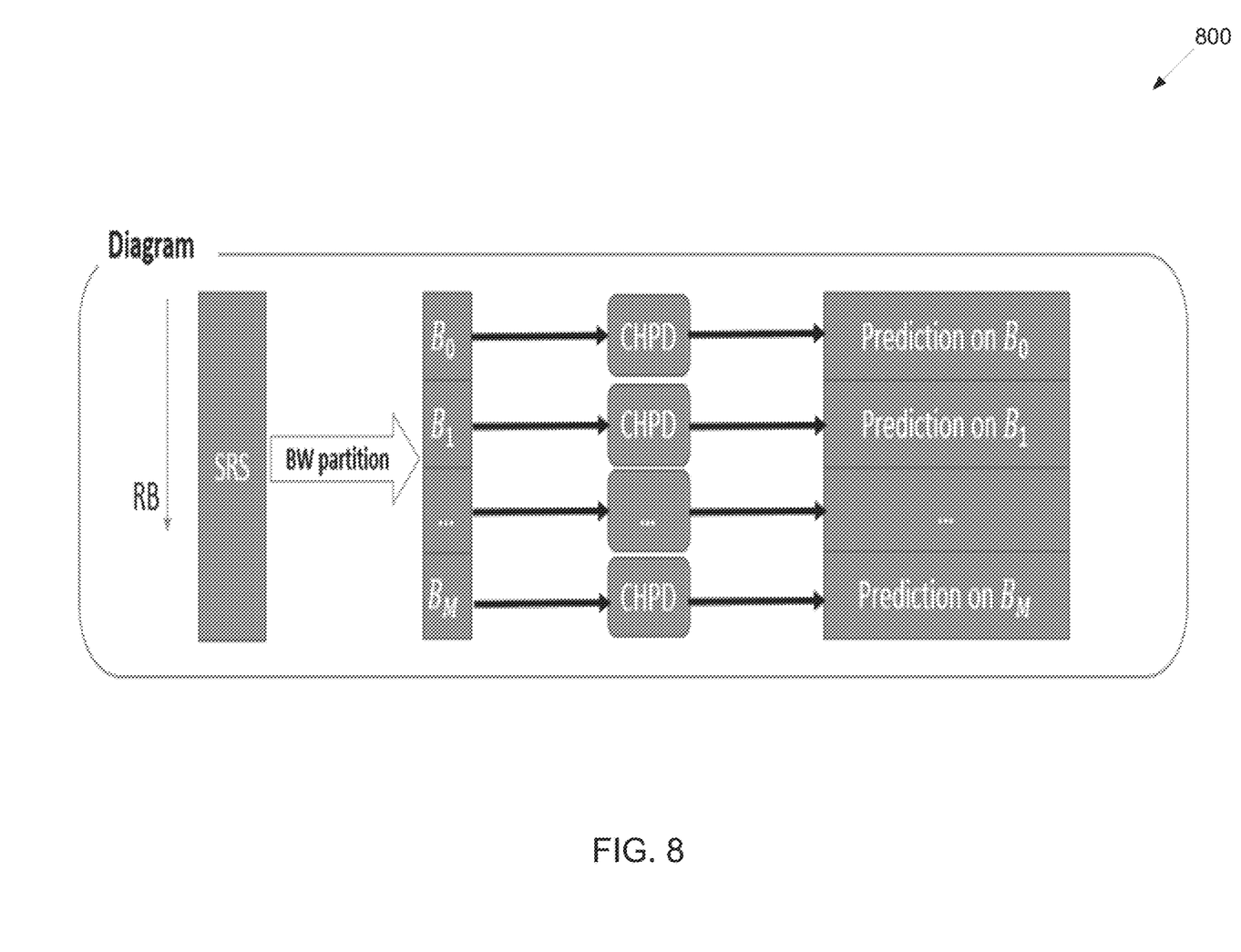
FIG. 8 illustrates an example partitioning of SRS according to embodiments of the present disclosure.

The partitioning of input SRS performs along the frequency domain, and the diagram is shown in FIG. 8.

FIG. 8 illustrates an example partitioning of SRS according to embodiments of the present disclosure. An embodiment of the partitioning of SRS shown in FIG. 8 is for illustration only.

In one embodiment, a control partition module 702 can also derive different processing configurations for CHPD. In one example the control partition module computes channel correlation matrix based on past SRS, and uses minimum description length (MDL) to derive the optimal path number for CHPD processor, which is an important algorithm parameter that affects both performance and complexity.

It first estimates empirical frequency correlation matrix from past SRS $R_f \in C^{K \times K}$, where K is the number of frequency domain samples, and $N_{ave}$ is the number averaging samples. The eigenvalues of $R_f$ are denoted as $\lambda_k$. The MDL formulation is given as follows:

$$L = \arg\min_{1 \leq \mu \leq K-1} -\log\left(\frac{(\Pi_{k=\mu+1}^{K} \lambda_k)^{\frac{1}{K-\mu}}}{\frac{1}{K-\mu}\Sigma_{k=\mu+1}^{K}\lambda_k}\right)^{N_{ave}(K-\mu)} + \frac{1}{4}\mu(2K-\mu+1)\log N_{ave}.$$

In one embodiment, this MDL is used to estimate the number of paths needed in a CHPD module.

In another embodiment, the model order or number of paths is determined by running online hypotheses evaluation on the received SRS, where hypotheses include a set of model orders and the best order is selected for actual processing.

In one embodiment, the model order can be determined by the reconstruction model error and SNR. For example, given a certain SNR, if the power of the difference signal between the reconstructed response and the actual received response exceeds a thread for a certain amount of time window or time instances, the model order may be increased by 1 or more; otherwise, if the residual error is smaller than a certain threshold for a certain amount of time, the model order may be reduced by one or more.

A multi-partition processing module 704 includes several CHPD processors, and the number of processors is determined by a partition module 702. In one embodiment, the multi-partition processing module independently executes and generates separate outputs. In another embodiment, intermediate results are shared between different processors, when CHPD processor executes a recursive algorithm that requires history of tracked parameters, such as channel path delay, Doppler and complex weight.

A result combine module 706 aggregates partial prediction from multiple outputs of parallel CHPD processors. In one embodiment, the result combine module combines these partial results along the frequency domain, because input CSI is divided along this dimension in a partition module. In another embodiment, the combine module can selectively replace partial prediction results, if it determines that the quality of partial prediction is bad. The determination of prediction quality can be done by monitoring certain channel metrics or derived from algorithm processing logs.

Figure 9:
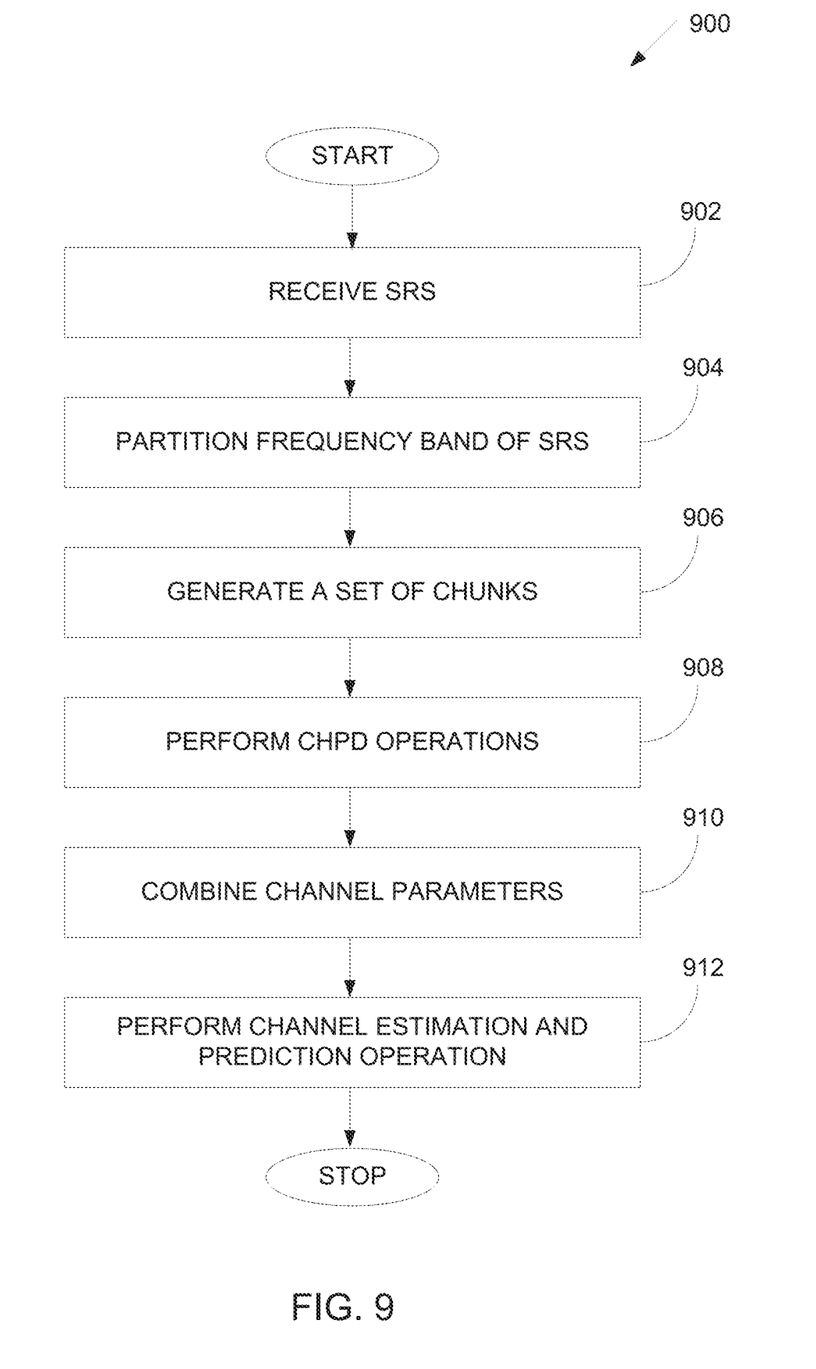
FIG. 9 illustrates a flowchart of a method for bandwidth-adaptive and model order adaptive channel prediction according to embodiments of the present disclosure.

FIG. 9 illustrates a flowchart of a method 900 for bandwidth-adaptive and model order adaptive channel prediction according to embodiments of the present disclosure. The method 900 as may be performed by a BS (e.g., 101-103 as illustrated in FIG. 1). An embodiment of the method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

As illustrated in FIG. 9, the method 900 begins at step 902. In step 902, a BS receives an SRS.

In step 904, the BS partitions, based on a partition policy, a frequency band of the SRS into sub-bandwidths in a frequency domain. In step 904, the partition policy is determined based on a frequency hopping pattern of the SRS, a bandwidth of the SRS, and a periodicity of the SRS, the partition policy comprising a sub-band partition scheme and a full-band partition scheme.

In step 906, the BS generates, based on previously stored CSI in memory and the partition policy, a set of chunks corresponding to respective sub-bandwidths.

In step 908, the BS performs CHPD operations corresponding to the respective sub-bandwidths to generate channel parameters, wherein different CHPD operations are applied to the respective sub-bandwidths.

In step 910, the BS combines the channel parameters predicted from the respective sub-bandwidths in the frequency domain.

In step 912, the BS performs, based on the combined channel parameters, a channel estimation and prediction operation.

In one embodiment, the BS updates the previously stored CSI with predicted CSI that is determined based on the channel estimation and prediction operation.

In one embodiment, the BS receives a CSI report including current CSI, identifies the partition policy for the current CSI, and generates, based on the partition policy, the set of chunks corresponding to the respective sub-bandwidth.

In one embodiment, the BS partitions a full-band of the SRS into the set of chunks in the full-band partition scheme and partitions TAS-SRS into the set of chunks among different UE antennas.

In one embodiment, the BS performs a joint processing operation for the CHPD operations to share information with each other. In such embodiment, the information includes at least one of a path delay or path Doppler and the information is used as initial information to perform the CHPD operations.

In one embodiment, the BS performs, over one or more respective sub-bandwidths, a moving average operation to filter the at least one of the path delay or the path Doppler.

$$L = \arg\min_{1 \le \mu \le K-1} -\log\left(\frac{(\Pi_{k=\mu+1}^{K}\lambda_k)^{\frac{1}{K-\mu}}}{\frac{1}{K-\mu}\Sigma_{k=\mu+1}^{K}\lambda_k}\right)^{N_{ave}(K-\mu)} + \frac{1}{4}\mu(2K-\mu+1)\log N_{ave}$$

In one embodiment, the BS partitions a frequency band of current CSI into the respective sub-bandwidths in the frequency domain, identifies, based on the SRS, a model-order using a reconstruction model error and an SNR for the CHPD operations, and performs, based on the partitioned frequency band of the current CSI and the identified model-order, the channel estimation and prediction operation.

In one embodiment, the BS partitions the frequency band of the SRS based on a performance metric including ACK)/NACK of an H-ARQ operation and an MCS and partitions the frequency band of the SRS based on accuracy information of the channel estimation and prediction operation.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A base station (BS) in a wireless communication, the BS comprising:
   a transceiver configured to receive a sounding reference signal (SRS); and a processor operably connected to the transceiver, the processor configured to:
  partition, based on a partition policy, a frequency band of the SRS into sub-bandwidths in a frequency domain,
  generate, based on previously stored channel state information (CSI) in memory and the partition policy, a set of chunks corresponding to respective sub-bandwidths,
  perform channel prediction (CHPD) operations corresponding to the respective sub-bandwidths to generate channel parameters, wherein different CHPD operations are applied to the respective sub-bandwidths,
  combine the channel parameters predicted from the respective sub-bandwidths in the frequency domain, and
  perform, based on the combined channel parameters, a channel estimation and prediction operation.

2. The BS of claim 1, wherein the processor is further configured to update the previously stored CSI with predicted CSI that is determined based on the channel estimation and prediction operation.

3. The BS of claim 2, wherein:
  the transceiver is further configured to receive a CSI report including current CSI; and
  the processor is further configured to:
    identify the partition policy for the current CSI, and
    generate, based on the partition policy, the set of chunks corresponding to the respective sub-bandwidth.

4. The BS of claim 1, wherein the partition policy is determined based on a frequency hopping pattern of the SRS, a bandwidth of the SRS, and a periodicity of the SRS, the partition policy comprising a sub-band partition scheme and a full-band partition scheme.

5. The BS of claim 4, wherein the processor is further configured to:
  partition a full-band of the SRS into the set of chunks in the full-band partition scheme; and
  partition transmit antenna system (TAS)-SRS into the set of chunks among different user equipment (UE) antennas.

6. The BS of claim 1, wherein:
  the processor is further configured to perform a joint processing operation for the CHPD operations to share information with each other;
  the information includes at least one of a path delay or path Doppler; and
  the information is used as initial information to perform the CHPD operations.

7. The BS of claim 6, wherein the processor is further configured to perform, over one or more respective sub-bandwidths, a moving average operation to filter the at least one of the path delay or the path Doppler.

8. The BS of claim 1, wherein the processor is further configured to:
  calculate a channel correlation matrix based on previously received SRS; and
  identify an optimal path number for the CHPS operations based on the channel correlation matrix and a minimum description length (MDL) as given by:

$$L = \arg\min_{1 \leq \mu \leq K-1} -\log\left(\frac{(\Pi_{k=\mu+1}^{K}\lambda_k)^{\frac{1}{K-\mu}}}{\frac{1}{K-\mu}\Sigma_{k=\mu+1}^{K}\lambda_k}\right)^{N_{ave}(K-\mu)} + \frac{1}{4}\mu(2K-\mu+1)\log N_{ave}$$

where $\mu$ is an optimization variable, K is a number of frequency domain samples, and $N_{ave}$ is a number of averaging samples, and eigenvalues of $R_f$ are denoted as $\lambda_k$.

9. The BS of claim 1, wherein the processor is further configured to:
  partition a frequency band of current CSI into the respective sub-bandwidths in the frequency domain;
  identify, based on the SRS, a model-order using a reconstruction model error and a signal-to-noise ratio (SNR) for the CHPD operations; and
  perform, based on the partitioned frequency band of the current CSI and the identified model-order, the channel estimation and prediction operation.

10. The BS of claim 1, wherein the processor is further configured to:
  partition the frequency band of the SRS based on a performance metric including acknowledgement (ACK)/negative acknowledgement (NACK) of a hybrid automatic repeat request (H-ARQ) operation and a modulation and coding scheme (MCS); and
  partition the frequency band of the SRS based on accuracy information of the channel estimation and prediction operation.

11. A method of a base station (BS) in a wireless communication, the method comprising:
  receiving a sounding reference signal (SRS);
  partitioning, based on a partition policy, a frequency band of the SRS into sub-bandwidths in a frequency domain;
  generating, based on previously stored channel state information (CSI) in memory and the partition policy, a set of chunks corresponding to respective sub-bandwidths;
  performing channel prediction (CHPD) operations corresponding to the respective sub-bandwidths to generate channel parameters, wherein different CHPD operations are applied to the respective sub-bandwidths;
  combining the channel parameters predicted from the respective sub-bandwidths in the frequency domain; and
  performing, based on the combined channel parameters, a channel estimation and prediction operation.

12. The method of claim 11, further comprising updating the previously stored CSI with predicted CSI that is determined based on the channel estimation and prediction operation.

13. The method of claim 12, further comprising:
  receiving a CSI report including current CSI;
  identifying the partition policy for the current CSI; and
  generating, based on the partition policy, the set of chunks corresponding to the respective sub-bandwidth.

14. The method of claim 11, wherein the partition policy is determined based on a frequency hopping pattern of the SRS, a bandwidth of the SRS, and a periodicity of the SRS, the partition policy comprising a sub-band partition scheme and a full-band partition scheme.

15. The method of claim 14, further comprising:
  partitioning a full-band of the SRS into the set of chunks in the full-band partition scheme; and
  partitioning transmit antenna system (TAS)-SRS into the set of chunks among different user equipment (UE) antennas.

16. The method of claim 11, further comprising performing a joint processing operation for the CHPD operations to share information with each other, wherein:
the information includes at least one of a path delay or path Doppler, and
the information is used as initial information to perform the CHPD operations.

17. The method of claim 16, further comprising performing, over one or more respective sub-bandwidths, a moving average operation to filter the at least one of the path delay or the path Doppler.

18. The method of claim 11, further comprising:
calculating a channel correlation matrix based on previously received SRS; and
identifying an optimal path number for the CHPS operations based on the channel correlation matrix and a minimum description length (MDL) as given by:

$$L = \arg\min_{1 \leq \mu \leq K-1} -\log\left(\frac{(\Pi_{k=\mu+1}^{K} \lambda_k)^{\frac{1}{K-\mu}}}{\frac{1}{K-\mu}\Sigma_{k=\mu+1}^{K}\lambda_k}\right)^{N_{ave}(K-\mu)} + \frac{1}{4}\mu(2K - \mu + 1)\log N_{ave}$$

where $\mu$ is an optimization variable, K is a number of frequency domain samples, and $N_{ave}$ is a number of averaging samples, and eigenvalues of $R_f$ are denoted as $\lambda_k$.

19. The method of claim 11, further comprising:
partitioning a frequency band of current CSI into the respective sub-bandwidths in the frequency domain;
identifying, based on the SRS, a model-order using a reconstruction model error and a signal-to-noise ratio (SNR) for the CHPD operations; and
performing, based on the partitioned frequency band of the current CSI and the identified model-order, the channel estimation and prediction operation.

20. The method of claim 11, further comprising:
partitioning the frequency band of the SRS based on a performance metric including acknowledgement (ACK)/negative acknowledgement (NACK) of a hybrid automatic repeat request (H-ARQ) operation and a modulation and coding scheme (MCS); and
partitioning the frequency band of the SRS based on accuracy information of the channel estimation and prediction operation.

* * * * *